Jan. 28, 1958  R. W. JENSEN  2,821,414
PRESSURE BALANCED BELLOWS TYPE FLEXIBLE COUPLING FOR CONDUITS
Filed July 6, 1954  2 Sheets-Sheet 1

RAYMOND W. JENSEN,
INVENTOR.

BY John H. J. Wallace

Jan. 28, 1958 R. W. JENSEN 2,821,414
PRESSURE BALANCED BELLOWS TYPE FLEXIBLE COUPLING FOR CONDUITS
Filed July 6, 1954 2 Sheets-Sheet 2

RAYMOND W. JENSEN,
INVENTOR.

BY John H. Wallace

United States Patent Office 2,821,414
Patented Jan. 28, 1958

2,821,414

PRESSURE BALANCED BELLOWS TYPE FLEXIBLE COUPLING FOR CONDUITS

Raymond W. Jensen, Encino, Calif., assignor to The Garrett Corporation, Los Angeles, Calif., a corporation of California Application July 6, 1954, Serial No. 441,483

3 Claims. (Cl. 285—47)

This invention relates to flexible couplings, and more particularly to a pressure-balanced coupling for use in connecting conduits for fluid under pressure which are subject to slight angular movement with respect to each other.

In gas turbine plants, for example, conduits are used to connect different elements to each other. Valves are generally provided in these conduits to control the flow of fluids and when these valves are actuated, a surge of pressure occurs. The sudden increase or decrease in pressure tends to force apart or draw together the conduits at their coupling points. This action, added to the inherent vibration in such plants, eventually causes leakage at such couplings.

It is therefore an important object of this invention to provide a coupling for conduits carrying fluid under pressure which will automatically compensate for and balance the variable internal pressures therein which tend to separate the conduits in a longitudinal direction.

Another object of the invention is to provide a more effective pressure-balanced coupling for conduits carrying pressurized fluid, which will automatically compensate for and balance the variable internal pressures therein tending to separate the conduits in a longitudinal direction, and which may be used to convey hot gaseous fluids such as are frequently employed in modern turbine installations.

Yet another object of this invention is to provide a pressure-balanced coupling for conduits which is particularly adapted to resist the effects of vibration and which also allows some angular and lateral misalignment between the ducts, for purposes of installation.

A further object of this invention is to provide a pressure-balanced coupling between two conduits which utilizes the varying pressures inside the conduits to oppose the forces tending to separate them.

Other objects and advantages of the present invention will become apparent by reference to the appended claims and from the following description.

Referring to the embodiments of the invention illustrated in the accompanying drawings.

Figure 1:
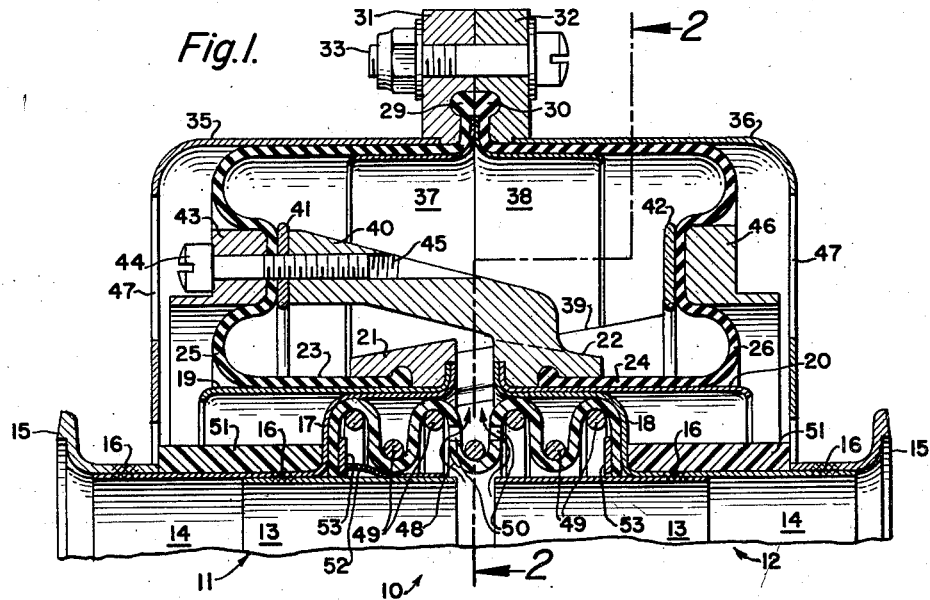
Fig. 1 is a fragmentary sectional view through a coupling illustrating a preferred form of the invention.
Figure 2:
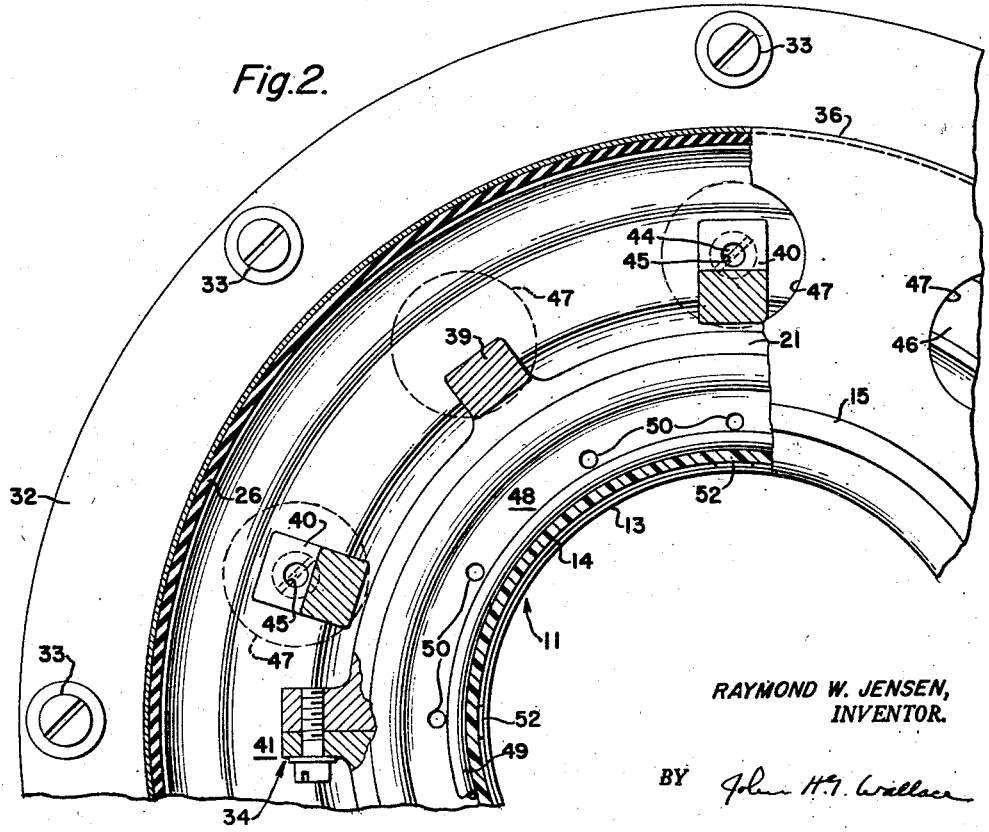
Fig. 2 is a fragmentary sectional view taken along the line 2—2 of Fig. 1.

As illustrated in Figs. 1 and 2 of the drawings, a conduit 10 suitable for the passage of hot fluids, includes a first tubular member 11 and a second tubular member 12. These are disposed axially of and with adjacent ends in spaced relationship to each other. For ease of manufacture, each tubular member 11 and 12 is formed of an inner sleeve 13 and an outer sleeve 14. The outer ends of sleeves 14 are provided with fittings 15 for securing thereto suitable conduits connected to components of a turbine installation or the like, not shown. Inner sleeves 13, outer sleeves 14 and fittings 15 may be spotwelded to each other as indicated at 16. Portions 17 and 18 of the outer sleeves 14 are flared to a larger diameter and are fixed to the sealing members 19 and 20.

Rings 21 and 22 may be formed of semicircular segments secured to each other as indicated at 34 in Fig. 2. These rings are mounted on the members 19 and 20 to support and pressure seal the inner peripheries 23 and 24 respectively of flexible diaphragms 25 and 26. The outer peripheries 29 and 30 of the flexible diaphragms 25 and 26 are locked together by outer flanged locking rings 31 and 32 fastened to each other by screw bolts 33.

Cover plates 35 and 36, together with seal retaining members 37 and 38 coact with the locking rings 31, 32 to support the outer peripheries of diaphragms 25 and 26.

The ring 22 is provided with integral lugs 40 equally spaced about its circumference and which extend to abut a surface of inner diaphragm washer 41. Outer diaphragm washer 43 is provided with screws 44 extending through the diaphragm 25 and washers 41 and 43 into threaded holes 45 in the lugs 40. In a similar manner the ring 21 is provided with lugs 39 equally spaced about its circumference, spaced intermediate of the lugs 40, and which extend to abut the surface of inner diaphragm washer 42. Outer diaphragm washer 46, diaphragm 26 and inner diaphragm washer 42 are secured to the lugs 39 by screws 44. Apertures 47 in the sides of cover plates 35 and 36 are provided for assembly purposes in order to insert screws 44 and to permit circulation of air for cooling.

In the annular space provided between the sleeves 13 and the enlarged diameter flared portions 17 and 18 of the outer sleeves 14, is a corrugated member 48 of heat resistant material. This may be a suitable plastic, for example, and is preferably reinforced with wire rings 49.

Openings 50 in the corrugated flexible heat resistant member 48 allow fluid pressure from the conduit 10 to be exerted on the diaphragms 25 and 26 as shown by the arrows in Fig. 1. Additional heat insulation is provided by plastic batts 51 surrounding portions of the outer sleeves 14. Suitable spring clips 52 acting against the washers 53 serve to retain the heat resistant member 48 in position.

It should be noted that the total effective area of each diaphragm should be equal to the effective cross-sectional area of the conduit 10 in order to obtain a fully pressure balanced coupling.

Assuming that fluid under pressure, which may be a hot fluid, is flowing through conduit 10, the preferred form of this invention as illustrated in Figs. 1 and 2 operates as follows:

The pressure of the fluid is manifested through the holes 50 in the corrugated flexible heat resistant member 48 and into the space between the diaphragms 25 and 26.

Since the pressure on the diaphragms equals the pressure in the conduit, the forces acting to separate the first tubular member 11 from the second tubular member 12 will be balanced by the forces acting against the first flexible diaphragm and against the second flexible diaphragm, which forces tend to urge the tubular members 11 and 12 toward each other.

Due to the heat insulation provided and since the diaphragms 25 and 26 have a relatively large area in contact with metallic parts such as cover plates 35 and 36 which are exposed to ambient temperatures, the fluid acting against the diaphragms will become considerably cooler than the temperature of the fluid in the conduit.

Figure 3:
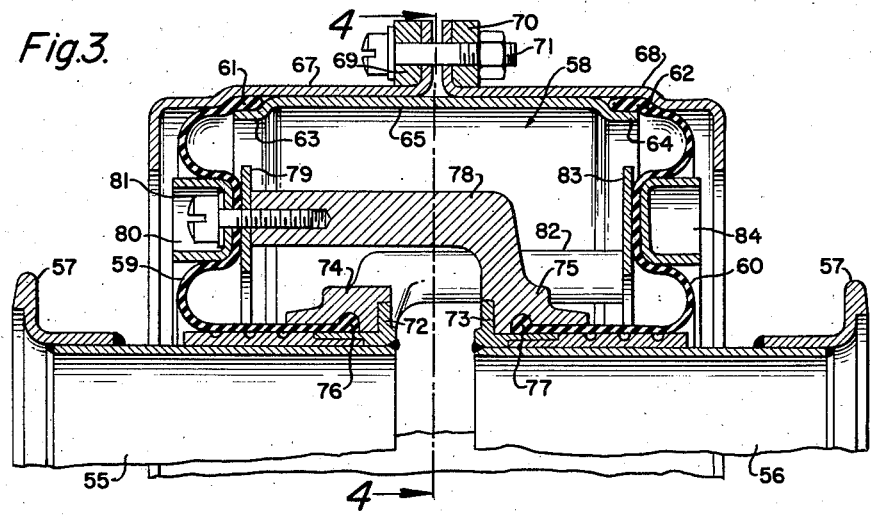
Fig. 3 is a fragmentary sectional view through a modified form of the invention.
Figure 4:
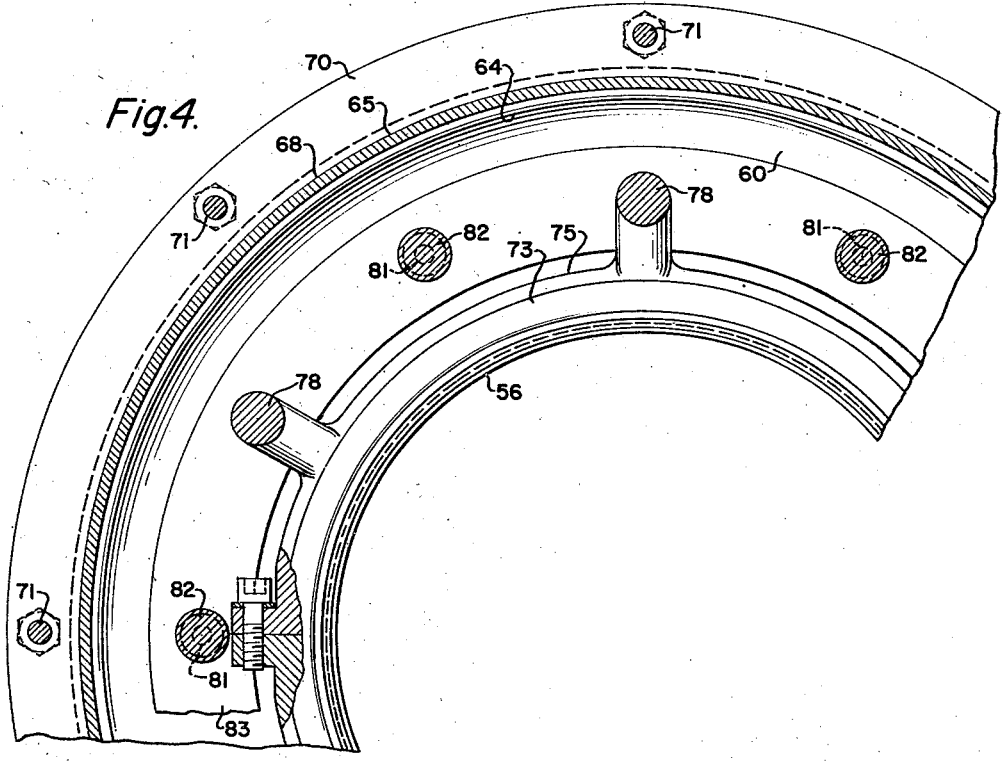
Fig. 4 is a fragmentary sectional view as taken on the line 4—4 of Fig. 3.

The modified form of the invention illustrated in Figs. 3 and 4 is preferably used where the fluid under pressure is not at very high temperatures. The coupling is formed of a first tubular member 55 in axial alignment with a second tubular member 56. These tubular members are provided with fittings 57 on one end thereof for attachment to suitable conduits, not shown. The opposite ends of these tubular members are spaced apart to allow communication with an annular space 58 surrounding the tubular members 55 and 56 near their adjacent ends.

The space 58 is defined by a first annular flexible diaphragm 59 and a second annular flexible diaphragm 60. The outer peripheries 61 and 62 of the diaphragms are pressure sealed between portions 63 and 64 of an inner seal retaining member 65 and outer cover plates 67 and 68. Annular flanges 69 and 70 of the cover plates 67 and 68 are forced toward each other by circumferentially spaced bolts 71 and coact with the inner sleeve 65 to form an outer pressure seal for the coupling.

An inner pressure seal for the diaphragm includes annular flanged rings 72 and 73 welded to the tubular members 55 and 56. Rings 74 and 75 may consist of semicircular segments and are adapted to retain the inner peripheries 76 and 77 of the diaphragms in a pressure sealed condition. The ring 75, secured to the second tubular member 56, is provided with outwardly extending lugs 78 equally spaced about its circumference and which abut the inner diaphragm washer 79. Circular channel shaped member 80 secures the diaphragm 59 and washer 79 to the lugs 78 by means of screws 81. In a similar manner the ring 74 is provided with outwardly extending lugs 82 secured to the inner diaphragm washer 83 and channel shaped circular member 84 on the diaphragm 60 by means of screws 81.

The operation of this second form of the invention is similar to that of the preferred form previously described. However, a freer access of fluid between the annular space 58 and the tubular members 55 and 56 is provided with this structure, and counter-balancing of the forces acting to separate the tubular members 55 and 56 is effected more rapidly. This second form of the invention has fewer parts, is simpler in construction, requires less space and is lighter in weight. It is somewhat less suitable for use at high temperatures than the embodiment shown in Figs. 1 and 2.

I claim:

1. A flexible coupling for conduits comprising: first and second tubular members disposed in axial alignment and having adjacent ends in spaced relationship, an axially extendable member of heat resistant material provided with perforations and spanning the adjacent ends of said tubular members, a first diaphragm having its inner periphery sealed to the outside of said first tubular member adjacent one end of said extendable member, a second diaphragm having its inner periphery sealed to said second tubular member adjacent the other end of said extendable member, cover means mounted on the outer peripheries of said first and second diaphragms, said first and second diaphragms and said cover means forming a reinforced closed chamber surrounding the ends of said tubular members and in communication therewith through the perforations in said axially extendable member, means securing said first tubular member to the intermediate portion of said second diaphragm, and means securing said second tubular member to the intermediate portion of said first diaphragm.

2. In a flexible coupling for conduits: first and second tubular members disposed in axial alignment with adjacent ends in spaced relationship, a corrugated flexible member of heat resistant material provided with perforations and spanning the adjacent ends of said tubular members, a first diaphragm having its inner periphery sealed to said first tubular member adjacent one end of said corrugated member, a second diaphragm having its inner periphery sealed to said second tubular member adjacent the other end of said corrugated member, cover means sealing the outer peripheries of said first and second diaphragms, said first and second diaphragms forming a reinforced closed chamber surrounding the adjacent ends of said tubular members and in communication therewith through the perforations in said corrugated member, and means securing the first tubular member with the intermediate portion of the second diaphragm and the second tubular member with the intermediate portion of the first diaphragm, said means consisting of lugs circumferentially spaced within said chamber and alternately disposed between said tubular members and said diaphragms.

3. A pressure balanced coupling for a conduit under varying fluid pressure comprising: first and second tubular members in axial alignment and disposed with adjacent ends in spaced relationship, a first flexible diaphragm having its inner periphery secured to the outside of said first tubular member near one of its ends and in sealed relationship therewith, a second flexible diaphragm having its inner periphery secured to the outside of said second tubular member near one of its ends and in sealed relationship therewith, means forming a pressure seal with the outer peripheries of said first and second diaphragms consisting of an internal ring provided with offset flanges to support the inside of said outer peripheries of said diaphragms and flanged locking rings disposed in opposition to said internal ring for sealing said outer peripheries of said diaphragms, a first series of lugs spaced circumferentially around the said end of said first tubular member and having their opposite ends secured to said second flexible diaphragm, and a second series of lugs spaced circumferentially around the said end of said second tubular member and having their opposite ends secured to said first flexible diaphragm.

References Cited in the file of this patent

UNITED STATES PATENTS

| 2,376,475 | Bush | May 22, 1945 |
| 2,568,923 | McNeary et al. | Sept. 25, 1951 |

FOREIGN PATENTS

| 396,685 | Great Britain | Nov. 6, 1931 |
| 725,839 | France | Feb. 16, 1932 |